INVENTORS
ISAAC D. NEHAMA
CLARENCE A. LOVELL
BY Jacobi & Davidson
ATTORNEYS

United States Patent Office 3,564,543
Patented Feb. 16, 1971

3,564,543
AIRCRAFT LANDING CONTROL SYSTEM
Isaac D. Nehama, Bethesda, Md., and Clarence A. Lovell, McLean, Va., assignors to Air Land Systems Co., Fairfax, Va., a partnership of Virginia
Filed Sept. 5, 1968, Ser. No. 757,667
Int. Cl. G01s 9/04, 9/56
U.S. Cl. 343—6.5                    19 Claims

ABSTRACT OF THE DISCLOSURE

A versatile all-weather landing control system is disclosed, the aircraft landing control system being capable of landing aircraft in zero-zero visibility with the same time spacing between aircraft as is achieved during normal, unlimited visibility landings. The subject invention contemplates the provision of a plurality of receiving antennas and/or transmitting antennas disposed in a predetermined geometric configuration on the ground adjacent the runway and preferably in symmetrical relationship to the center line thereof. The aircraft to be landed also carries receiving and transmitting equipment of varying complexity as desired. Through interaction of the ground and "on board" equipment, the spatial position of the aircraft and its deviation from a prescribed glide path can be determined, such determination involving a "trilateration" technique utilizing data represenative of the straight-line distance of the aircraft from the plurality of antennas on the ground. Once the aircraft position is known, guidance of the aircraft to landing is possible in a safe and accurate manner, the landing of the aircraft either being effected manually by the pilot or being effected by the "auto-pilot" system or the like on the aircraft, the actual guidance data either being computed on the ground or on the aircraft itself.

---

This invention generally relates to aircraft landing systems and particularly concerns an aircraft landing system wherein the precise position of the aircraft to be landed and its deviation from a prescribed glide path is determined in a relatively simple yet highly accurate manner.

The rapid increase in air travel, both commercial and private, which we are experiencing today its virtually unprecedented. This increase in air travel and the resultant increase in daily take-offs and landings poses a challenge even to the most modern large-city airport. More and more planes must be handled at increasingly faster rates if ground facilities are ever to be equal to the task.

During unlimited visibility conditions, an airport can presumably operate at its maximum capacity with the time spacing between each landing, for example, being at a minimum precsribed by the various governmental regulating agencies. The operating capacity, however, decreases when the visibility at an airport deteriorates, although the operating capacity is still kept relatively high since most modern airports provide one type or another of an instrumented aricraft landing system such as the "ILS" system now in widespread use. Such a system permits an aircraft to land, with restrictions, under adverse visibility conditions, and thus lessens the importance of weather conditions.

However, many drawbacks and disadvantages are present with the instrument landing systems now in use. Such systems still require a certain minimum visibility or "ceiling" before an aircraft can land and thus are not always cabable of actually maintaining the operating efficiency of an airport at that which occurs under "unlimited" visibility conditions. The presently utilized "instrument" landing control systems have a further drawback relative to complexity and cost, and thus only commercial airlines and larger private flying groups have found it economically feasible to install the "on board" equipment necessary for this type operation. Further, the prior air "instrument" aircraft landing systems leave much to be desired even with respect to accuracy and reliability of operation. As should be apparent, the prior art "instrument" aircraft landing systems afford no real solution to present day airport traffic control problems and are quite inadequate to cope with the mounting problem of airport traffic control of the future.

Thus, a need exists for a truly "all-weather" aircraft landing system which is capable of landing aircraft in "zero-zero" visibility with the same spacing between aircraft as is achieved with "unlimited" visibility. It is a primary object of the subject invention to provide such a system.

A further object of the subject invention is the provision of an aircraft landing system having an extremely high operational reliability and a built-in "back-up" against component failure.

Another object of the subject invention relates to the provision of an aircraft landing system of relatively simple construction and requiring a minimum of "on-board" equipment, if desired, thus making the system usable with almost any type of aircraft at extremely low costs.

A further object of the subject invention concerns the provision of an aircraft landing system possessing an extremely high degree of accuracy whereby aircraft position can be determined with very little error as required for instrument guidance to touchdown.

A still further object of the subject invention is the provision of an aircraft landing system wherein the aircraft making a landing approach can be landed through a ground-to-aircraft "talk down" procedure, as well as through the utilization of standard "error display" instruments in the aircraft.

Another object of the subject invention concerns the provision of an aircraft landing system capable of controlling in a simultaneous manner a number of aircraft making landing approaches with control of one aircraft in no way interfering with the control of other aircraft.

The above-described objects, as well as other objects which will become apparent as the description proceeds, are implemented by the subject invention in that precise data of the aircraft location with respect to the runway and the deviation of the aircraft from a prescribed glide path is continuously derived from either ground or "on-board" measurements until touchdown, the position information being converted into guidance instructions and communicated to the landing aircraft either orally as in a "talk down" procuduce, by visual display of deviations from the desired landing course upon instruments before the pilot, or by a closed-loop "auto pilot" control to thus land the aircraft in a completely automatic fashion. The particular method or technique utilized to actually land the aircraft, as discussed above, depends entirely on the equipment utilized in the landing aircraft, the basic inventive system being compatible with all three techniques.

The subject inventive system, in a basic construction thereof, comprises a plurality of receiving antennas and/or transmitting antennas disposed in a fixed, predetermined geometric configuration on the ground adjacent the runway and preferably in symmetrical relationship to the center line thereof. The aircraft to be landed also carries receiving and transmitting equipment of varying complexity as desired. Through interaction of the ground and "on board" equipment, the spatial position of the aircraft and its deviation from a prescribed glide path can be determined, such determination involving a "tri-lateration" technique utilizing data representative of the straight-line distance of the aircraft from the plurality of antennas on the ground. Once the aircraft position is known, guidance of the aircraft to landing is possible in a safe and accurate manner, the landing of the aircraft being effected, as discussed above, either manually by the pilot or by the "auto-pilot" system or the like on the aircraft, the actual guidance data either being computed on the ground or on the aircraft itself.

In one preferred embodiment of the subject invention, a plurality of receivers and at least one transmitter are disposed in four ground stations adjacent to the airport runway in symmetrical position to either side of the center line thereof. Each aircraft to be landed is merely provided with a simple, coherent transponder which receives the signal transmitted from the ground transmitter and serves to re-transmit it to the ground receivers, the re-transmitted signal being at a different frequency. The different lengths of time between transmission of the signal from the ground transmitter and the receipt of the signal re-transmitted by the aircraft transponder by each of the plurality of ground receivers is measured and the straight-line distances between each of the plurality of ground receivers and the approaching aircraft is calculated. From these determined distances, the actual physical position of the aircraft in a three-dimensional system is calculated, preferably through computer techniques, and guidance information is computed and transmitted to the aircraft as discussed above. Accordingly, aircraft can be landed when utilizing the subject inventive system under the most adverse weather conditions, such as "zero-zero" visibility since accurate control or guidance of the aircraft is possible from the initial "acquisition" point to the final touchdown on the runway.

Alternative preferred embodiments of the subject inventive system are also disclosed, each of the alternative preferred embodiments offering various advantages consistent with particular airport requirements and being usable to control and land aircraft having "on board" equipment of varying complexity, as desired. Each of the alternative inventive embodiments exhibit the same general structural configuration as discussed above in that a plurality of receiving antennas and/or transmitting antennas are disposed in a predetermined, fixed geometric configuration on the ground adjacent the airport runway. The operating principle of each of the alternative embodiments is also the same as discussed above in that each alternative embodiment likewise utilizes, a "tri-lateration" position determining technique. For example, the ground station could comprise three transmitters and one receiver, the transmitters continuously transmitting a signal in the direction of the approaching aircraft. In this embodiment, the aircraft to be landed would carry four receivers and one transmitter, this combination of ground and "on board" equipment being sufficient to determine the deviation of the approaching aircraft from a prescribed glide path and its spatial position with respect to the runway. In this alternative embodiment, the approaching aircraft would itself carry the computing equipment necessary to generate the guidance instructions.

Other preferred embodiments of the invention will be discussed in more detail below and the advantages and operational modes of each system will be compared. The basic invention itself will be better understood and additional features and general advantages thereof will become readily apparent when attention is directed to the following detailed description of many preferred embodiments thereof, such detailed description referring to the appended drawings, wherein.

Figure 1:
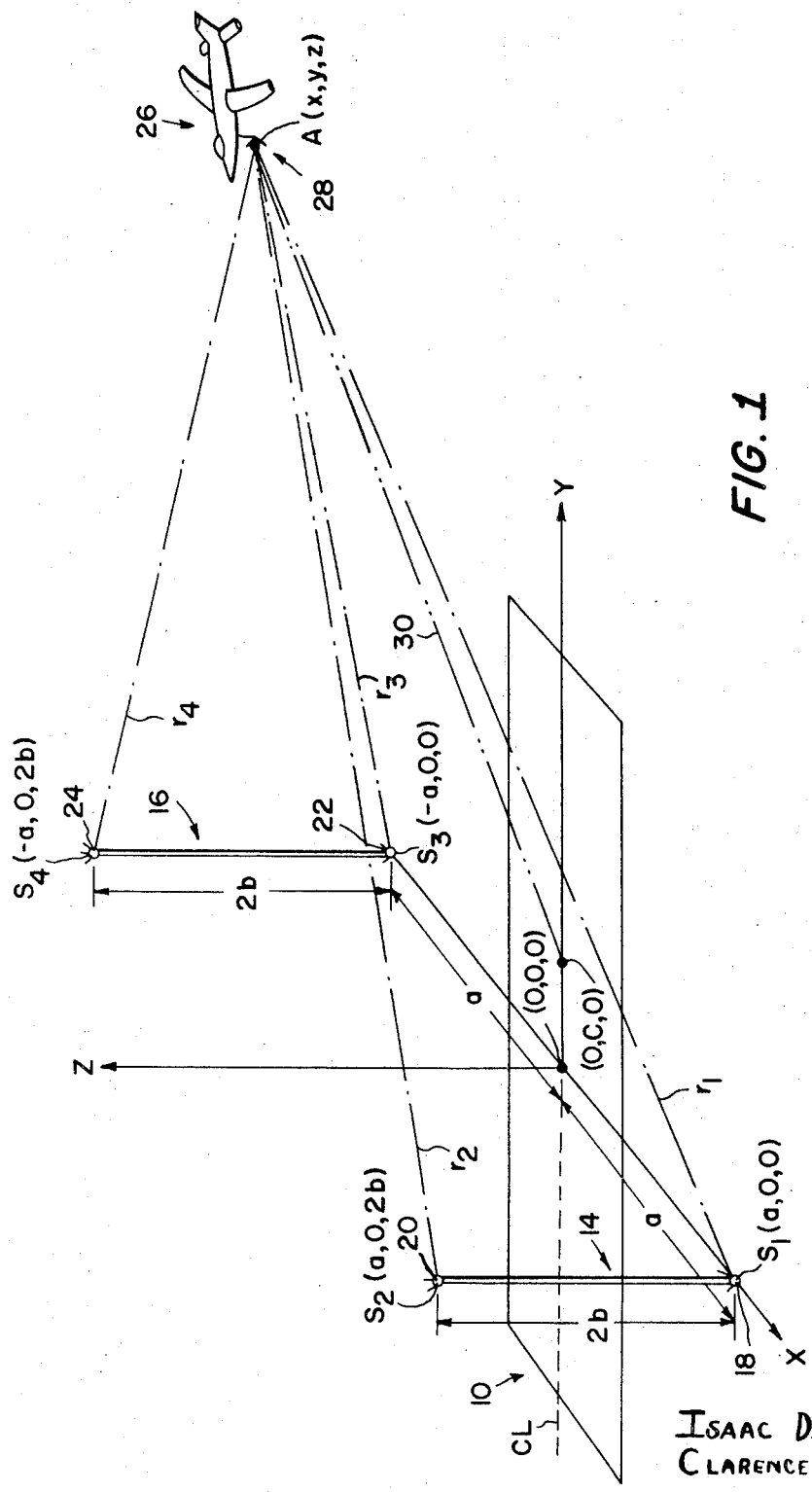
FIG. 1 is a schematic perspective illustration of one embodiment of the subject inventive system depicting the geometric placement in a three-dimensional coordinate system of the component parts thereof with respect to an airport runway and an approaching aircraft.

Referring now to FIG. 1, a first preferred embodiment of the subject inventive system is disclosed which will serve to illustrate the basic "tri-lateration" technique common to all forms of the invention. The system is disposed in a three-dimensional coordinate system having mutually perpendicular axes X, Y and Z. For purposes of facilitating description and for facilitating certain representative mathematical calculations to be derived below, the central point of the three-dimensional coordinate system (O,O,O) is constrained to be disposed approximately midway down the length of an airport runway designated 10 and on the center line CL thereof. Thus, the Z coordinate system direction represents vertical distance of altitude above the surface of the runway 10, the X coordinate direction represents lateral displacement from the center line of the runway 10, and the Y coordinate direction represents longitudinal distance along the center line of the runway 10 away from the coordinate system center (O,O,O).

Two physical units or antenna structures generally designated 14 and 16 are provided to either side of the center line CL of the airport runway 10 and, in this embodiment, are disposed in a generally perpendicular direction, in the direction of the Z coordinate system axis, from the runway surface. Antenna structure 14 and antenna structure 16 are preferably disposed equal distances designated $a$ from the center line CL of runway 10 and preferably extend upwardly an equal distance $2b$ in the Z coordinate system direction. Each antenna structure 14 and 16 in this embodiment, contains at least two receiving and/or transmitting units designated 18 and 20, and 22 and 24, respectively. Each of the receiving and/or transmitting units 18, 20, 22 and 24 are thus all located in a plane perpendicular to the surface of runway 10 defined by the X and Z axes of the coordinate system as illustrated. Antenna structure 14 preferably includes a combined receiver and transmitter 18 located at point $S_1$ $(a\ O\ O)$ and a receiver 20 located at point $S_2(a\ O,2b)$. Antenna structure 16 may be constructed identical to that of antenna structure 14 and preferably includes a combined transmitter and receiver 22 disposed at point $S_3$ $(-a\ O\ O)$ and a receiver 24 disposed at point $S_4$ $(-a\ O,2b)$.

An aircraft generally designated 26 is depicted as approaching the airport runway 10 and is physically disposed, in the three-dimensional coordinate system, at point A $(x,y,z)$. Aircraft 26, in this embodiment, is equipped with a simple coherent transponder generally designated 28 which is interrogated by coded signals received from either transmitter 18 or 22 and serves to re-transmit to the various receivers 18, 20, 22 and 24 on the ground the coded signal which it receives from the ground transmitters. The signal path between the approaching aircraft 26 and each of the ground receivers and/or transmitters 18, 20, 22 and 24 comprises a plurality of straight lines $r_1$, $r_2$, $r_3$, and $r_4$.

In a three-dimensional coordinate system such as that described above, the actual physical position of an object, that is the $x$, $y$, and $z$ position components thereof, can be determined by measuring the straight-line distance between the object and any three fixed points in the coordinate system. This three-dimensional technique is known as "tri-lateration" and it is this technique which the subject invention utilizes in all embodiments thereof to determine the position of an aproaching aircraft relative to the runway and to determine the deviation of the aircraft from a prescribed glide path. From these determinations guidance commands are derived to land the aircraft.

Now, referring again to FIG. 1, it should be immediately apparent that this "tri-lateration" technique can be effective to determine the actual physical location of approaching aircraft 26 in terms of its $x$, $y$ and $z$ position coordinates, that is to determine the coordinate components of point A. Due to the depicted system geometry, such determination can be made by measuring the distance of any three of the four lines $r_1$, $r_2$, $r_3$, or $r_4$, these lines representing the straight-line distance between fixed points 18, 20, 22, 24 and the unknown point A representing the approaching aircraft 26. Thus, any three distances designated $r$ is sufficient to determine the aircraft position as long as the aircraft is not in or near the plane defined by the three points at which the various receiving and/or transmitting antennas are located. Since the system geometry chosen in this embodiment is such that plane of the various receiving and/or transmitting antennas is near the center of the runway and perpendicular to the runway, no aircraft under landing control comes closer to this plane than about 4000 feet in actual practice. The various distances $r_1$, $r_2$, $r_3$, and $r_4$ are preferably determined by a technique wherein the length of time elapsed between transmission of a signal by one of the transmitters 18 and 22 and the receipt of the retransmitted signal from transponder 28 on the aircraft 26 at the various ground receivers 18, 20, 22 and 24 is measured and the distances calculated from the measured quantities. For example, and assuming that combined receiver and transmitter 18 is utilized to transmit a signal, the length of time that it takes the transmitted signal to travel along path $r_1$ between points $S_1$ and A to the transponder 28 on the aircraft 26 is designated $r_1$ divided by $v$, where $v$ equals the speed of radio propagation through air. Now, the transponder 28 on board the aircraft 26 would be interrogated by this incoming signal and caused to re-transmit it in the directions of all the fixed receivers 18, 20, 22, and 24. The length of time that it takes the re-transmitted signal from the transponder 28 to travel the distance between point A and point $S_4$ representing receiver 24, for example, along line $r_4$ is $r_4$ divided by $v$, where $v$ again represents the speed of radio propagation through air. Thus, for the selected path $r_1$ and $r_4$, a time period $t_4$, for example, can be calculated as.

(1)
$$t_4 = \frac{r_1}{v} + \frac{r_4}{v} + dt_4$$

wherein $dt_4$ represents a delay time in the system, such delay time to be discussed below. Similarly:

(2)
$$t_3 = \frac{r_1}{v} + \frac{r_3}{v} + dt_3$$

(3)
$$t_2 = \frac{r_1}{v} + \frac{r_2}{v} + dt_2$$

(4)
$$t_1 = \frac{r_1}{v} + \frac{r_1}{v} + dt_1$$

wherein $dt_3$, $dt_2$, and $dt_1$ are also delay times in the system.

Accordingly, a measurement of the time needed to transmit from transmitter 18, for example, to the transponder 28 on the aircraft 26 and to re-transmit the signal to the plurality of receivers 18, 20, 22 and 24 readily supplies the information pertaining to the length of lines $r_1$, $r_2$, $r_3$, or $r_4$, the determination of any three of these lengths being sufficient to determine the actual physical location of the aircraft 26 or more specifically, the location of point A.

Such measurement of the time elapsed between transmission and subsequent reception of the transmitted signal can very easily be made through the utilization of many well-known techniques. For example, the initial transmission of a signal from transmitter 18 could start a timing apparatus running in each of the receiving apparatus 18, 20, 22 and 24. When the retransmitted signal from transponder 28 is received by the various receivers, the respective timing devices would be automatically stopped. Thus, the time counted, that is the length of time between transmission and reception of the signals at each of the plurality of receivers, could very easily be determined and, from equations 1 through 4 above, such time determination readily leads to the calculation of the actual distances $r_1$, $r_2$, $r_3$, and $r_4$, respectively.

Such a simple time measurement has its disadvantages, however, concerning the accuracy and continuity thereof. Thus, although such a simple technique can be utilized with the subject inventive system, a more convenient and accurate method is proposed and is, in fact, contemplated for use in the preferred embodiment thereof. In this regard, a so-called "PN" ranging technique is contemplated for use, such ranging technique, in its basic conceptual form, amounting to a comparison of the phase of the received signal with the phase of the transmitted signal. A "PN" signal is a pseudo random noise signal consisting of a sequence of 1's and 0's in which the number of 1's generated differs from the number of 0's generated by at most 1. Thus, the carrier wave transmitted by the transmitter 18, for example, would have modulated thereon a sequence consisting of a plurality of "1's" and "0's" and such sequence would be continually generated. When received by the transponder 28 on board the aircraft 26, the transmitted signal is then re-transmitted at a different carrier frequency but with the same modulation of the sequence of "1's" and "0's" thereon. Each receiver 18, 20, 22 and 24 would include a phase or correlation detector which would generate the same coded sequence as transmitted by transmitter 18 but in arbitrary time phase and would match the generated sequence, bit by bit, with the received signal from the transponder 28 until a match of all bits occurs. The length of time necessary to achieve a match, that is the number of "shifts" in the sequence generated by the correlation detector, directly determines the time elapsed between original transmission of the signal at transmitter 18 and its reception at various and respective ones of the receivers 18, 20, 22 and 24 and thus directly determines the physical length of the signal path or the length of the straight-line components $r_1$, $r_2$, $r_3$, and $r_4$. Again, as discussed above, once the distances of any three of the straight-line components $r_1$, $r_2$, $r_3$, and $r_4$ are determined, the actual location of point A representing the aircraft 26 in the three-dimensional coordinate system is determined.

The "PN" ranging technique above discussed is by no means essential to the subject invention as mentioned above, virtually any ranging technique can be utilized. The "PN" ranging technique is preferred, however, since with such technique precise measurements of elapsed time and thus precise measurements of the various straight-line components $r$ can be made continuously even though the received signal is 30 db or more more below the noise level. Such a "PN" ranging technique is thus a highly accurate ranging method and, as a further advantage thereof, the signal derived as well as its basic accuracy are digital in nature, the technique using digital modulation of a transmitted carrier and correlation detector which gives a digital indication of a phase match and which has capabilities of distinguishing between a match and a mis-match of one bit, for example. Since the solution of the equations both given above and as will be discussed below, is contemplated to be carried out by computer technique, this digital operation of the ranging method is highly desirable.

From geometrical considerations in reference to FIG. 1, the actual equations of the various distances are as follows:

(5) $\quad r_1{}^2 = (x-a)^2 + y^2 + z^2$ (6) $\quad r_2{}^2 = (x-a)^2 + y^2 + (z-2b)^2$ (7) $\quad r_3{}^2 = (x+a)^2 + y^2 + z^2$ (8) $\quad r_4{}^2 = (x+a)^2 + y^2 + (z-2b)^2$ wherein the components $x$, $y$ and $z$ are those components of point A and determine the position of aircraft 26. Since through the ranging technique discussed above, time periods $t_1$ through $t_4$ can be determined, the solution of Equations 1 through 4 determines the values of $r_1$ through $r_4$ and when these values are known, Equations 5 through 8 are easily solved for $x$, $y$ and $z$ by use of a properly programmed digital computer. Thus, at this point in our analysis, it has been shown that the actual position of the aircraft 26 with respect to the three-dimensional coordinate system can be determined by merely calculating the length of time that it takes a signal transmitted by a transmitter, preferably located either at 18 or 22, to be re-transmitted by the transponder 28 on board the aircraft 26 and be received by at least three of the four fixed receivers 18, 20, 22 and 24.

Once the position of the aircraft 26 is initially determined, actual guidance of the same to a landing upon the airport runway 10 can very easily be accomplished. Referring again to FIG. 1, the approach path taken by the aircraft 26 to effect a landing is shown by the dotted line path designated 30, the dotted line path running between point A and a point on the airport runway 10 lying on the center line thereof, such point being designated (O, c, O). Again, from geometric considerations, it can easily be shown that if aircraft 26 is, in fact, to follow the dotted line approach path 30 for a landing, the following relationships must exist:

(9) $\quad r_2 - r_4 = r_1 - r_3 = 0$

(10) $\quad z = m(y-c)$

Thus, if the relationship between the values of $r$ are constrained to be that of Equation 9, aircraft 26 will necessarily land upon the airport runway 10 at some point along the center line CL thereof. Similarily, if the relationship of Equation 10 relating to the glide path is maintained, aircraft 26 will be constrained to land at point $c$ on the center line CL of the airport runway 10. The relationships illustrated by Equations 9 and 10, of course, maintain the aircraft 26 on the approach or glide path depicted by dotted line 30, and if the aircraft 26 deviates from glide path 30, an error signal would be produced. Equations 9 and 10 are contemplated to be similarly solved by ground computer devices in this embodiment which would generate guidance instructions for the aircraft 26 to keep the aircraft 26 on the approach path 30. These guidance instructions would be transmitted to the aircraft 26, as discussed above, in one of three ways depending upon the equipment carried on board the aircraft 26. Specifically, the guidance instructions can be transmitted orally to effect a "talk down" of the aircraft much as is done under the GCA system developed by the military services, the guidance instructions can be transmitted upon a visual display before the pilot or the guidance instructions can be transmitted to the aircraft via a "closed-loop" control effecting the auto-pilot of the aircraft to land the aircraft automatically.

The geometry of the embodiment of the subject inventive aircraft landing control system depicted in FIG. 1, and particularly the utilization of the antenna units 14 and 16 disposed symmetrically to either side of the airport runway 10, effects advantages other than extreme accuracy in aircraft position location and landing control. One such further advantage concerns the minimal effect that system time errors have on the actual landing control and position location of the aircraft. As discussed above and referring again to Equations 1 through 4, incremental time errors $dt_4$, $dt_3$, $dt_2$, and $dt_1$ enter into all measurements of elapsed time between signal transmission and signal reception. These incremental time errors arise through delays incurred in the system circuitry such as in the transmission lines between the ground transistter and ground receivers and in other components thereof. A further time delay occurs between interrogation of the transponder 28 carried on board the aircraft 26 and the re-transmission of the signal. Fortunately, all delays except the time delay of the aircraft transponder 28 occur in the ground circuits and such ground delays are, of cousre, subject to easy measurement and, since the system is symmetrically disposed on the ground, such ground delays can easily be matched and balanced in well-known manners as required to best eliminate the effect thereof from the position determination results of the aircraft 26.

The delay caused by the transponder 28 on board the aircraft 26 is not, however, amenable to such measurement and matching treatment since each transponder 28 on board each of the aircraft 26 to be landed will give rise to slightly different time delays. Fortunately, the transponder time delay is always positive and further, one-half of this transponder time delay appears as an error in each of the ranges measured. Accordingly, the ranges, that is the stright-line distance of the lines $r$, would, in fact, appear to be slightly longer than their actual length. The actual effect of the transponder time delay on the position location and landing control of an approaching aircraft 26 can easily be calculated, and from the system geometry chosen, it can be shown that the error in the $x$, $y$, and $z$ directions, i.e., $dx$, $dy$, and $dz$, is as follows:

(11) $\quad dx = 0$

(12) $\quad dy = \dfrac{v\tau}{2}\left[\sqrt{\dfrac{a^2+y^2+z^2}{y}} + \dfrac{z}{y}\left(\dfrac{b-z}{\sqrt{a^2+y^2}}\right)\right]$

(13) $\quad dz = v\tau\left[\dfrac{b}{2}\dfrac{z}{\sqrt{a^2 y^2}}\right]$ where $\tau$ is the transponder time-delay and $v$ equals the speed of radio propagation in air.

If representative values of the acquisition point, glide path slope, physical dimensions of the ground configuration and transponder delay uncertainty are inserted, it can be shown that typical errors in the touch-down point of the aircraft 26 in the various directions are as follows:

$dx = 0$
$dy = 250$ feet
$dz = 2.5$ feet

Thus, with the system geometry chosen, the time delay inherent in the aircraft transponder 28 effects no error whatsoever in the lateral or $x$ direction, that is the aircraft 26 will always land on the center-line CL of the runway 10. As should be appreciated, the error in the $x$ direction is perhaps the most critical of all possible errors and, with the system of the subject invention, such error has been eliminated. On the other hand, the error in the $y$ direction caused by the inherent time delay of the aircraft transponder may be approximately 250 feet. Yet, such error is not, in fact, significant when one considers the normal lengths of the airport runways. Specifically, since the error in the $y$ direction is positive, there is no problem whatsoever of the aircraft ever being brought down for a landing prior to the start of the airport runway 10. Similarly, an error of approximately 2.5 feet in altitude or the $z$ coordinate system direction is also not significant for effecting a landing.

An important characteristic advantage of the subject inventive landing system is that the error in aircraft position determination actually decreases as the aircraft nears the touchdown point on the runway. Of course, the closer the aircraft is to actual landing, the more critical is the determination of position. The advantages of increasing accuracy are not apparent from Equations 12 and 13. In the horizontal plane, this is made evident by subtracting Equation 5 from Equation 7 which leads to:

(13a) $$x = \frac{r_3^2 - r_1^2}{4} = \frac{(r_3 - r_1)(r_3 + r_1)}{4a}$$

Now $(r_3 - r_1)$ can be measured by radar techniques to a certain error say $\pm \delta$. Then the limits within which $x$ are known are:

(13b) $$|x| = \frac{\delta(r_3 + r_1)}{4a}$$

which obviously decreases along the approach as $(r_3 + r_1)$ decreases.

In the vertical plane, the value of $z$ is found by subtracting Equation 2 from Equation 1 to obtain:

(13)c $$z = \frac{(r_1 - r_2)(r_1 + r_2) + b^2}{4b}$$

Again, if $(r_1 - r_2) = \delta$, then (13d) $$|z| = \frac{\delta(r_1 + r_2) + b^2}{4b}$$

which also decreases as $(r_1 + r_2)$ decreases. The value of $|x|$ is the deviation from the center line of the glide path which corresponds to the error $\delta$ in measurement of $(r_3 - r_1)$. The value $|z|$ is the altitude and not the difference between the altitude and the altitude of the glide slope for the measured value of $(r_1 + r_2)$. However, the deviation from the glide slope will diminish as well when $|z|$ is determined by Equation 13d. This characteristic is present in each of the inventive embodiments of the subject landing system and is somewhat simpler to demonstrate in embodiments described below.

As already mentioned, the inventive aircraft landing control system requires only the measurement of three distances designated $r$ to effect a position determination and subsequent guidance instructions for an aircraft 26. Yet, in the embodiment of the subject invention illustrated in FIG. 1, four such distances are depicted and further, transmitters may be provided either at location 18, location 22, or both. The capability of the subject invention of effecting a measurement of four of the straight-line distances $r$, is of course, a redundant capability since only one transmitter and three receivers must be in operating condition. Yet, by providing extra transmitters and receivers, safe operation is assured since the failure of any receiver during the control of aircraft on the landing approaches would not cause any interruption of operation of the landing system. Likewise, if any one transmitter fails while in use, the other transmitters of the system would automatically take over. Accordingly, a failure of the component parts of the subject inventive system would be of no significance since back-up hardware is provided to assume the task of the failed unit. Thus, high reliability of the landing control system is inherently provided. Since, in the operating system described in FIG. 1, two transmitters and four receivers have been shown failure of one transmitter and one receiver, in this instance, can be tolerated without any loss of capability or precision. Each of the remaining inventive embodiments also can be provided with redundant, "back-up" components and/or stations.

The subject invention as so far described, has been directed to the position determination and landing guidance instructions for a single aircraft. Yet, it is to be expressly understood that the subject landing control system is capable of handling a plurality of aircraft all on a landing approach path. This capability is effected primarily through frequency multiplexing techniques. Specifically, the invention contemplates that a plurality of re-transmission channels be provided for each aircraft transponder 28, the particular re-transmission frequency being dictated by the ground control tower. Similarly, each of the ground receivers 18, 20, 22 and 24 in the embodiment of FIG. 1 would have associated therewith frequency selective demodulators such that each receiver could simultaneously operate to receive a plurality of different incoming signals all of different frequencies. Thus, when the first aircraft 26 makes its landing approach, the ground control tower would request the pilot to switch his transponder 28 to a first frequency and the demodulator of the ground receivers responsive to the first frequency, that is to a re-transmitted signal from the aircraft transponder 28 of said first frequency would develop the signals described above for the first approaching aircraft. If a second aircraft is also making a landing approach immediately behind the first aircraft, the ground control tower would request the pilot of the second aircraft to switch his transponder 28 to a second assigned frequency. Thus, the frequency selective networks of the ground receivers would also be responsive to the second frequency to develop the position and guidance signals as described above. Similarly, subsequent aircraft can also be simultaneously controlled, the only limitation on the number of aircraft that can be controlled at the same time relating to the capabilities of the transponders on the aircraft and the ground control system, that is to the number of frequencies available to the transponders and to the number of frequency selective demodulators and the like associated with each ground receiver. Accordingly, minimal spacing can be maintained between aircraft landings.

A further operating feature of the subject invention can be mentioned at this point. In the embodiment of FIG. 1, the ground structures 14 and 16 and the various antennas thereon have been described as effecting a ground station for controlling landings at runway 10. It is to be understood, however, that the illustrated ground structures can also control landings at other runways at the same airport. The basic operational technique remains the same as that discussed above although, as should be evident, the computer calculations and guidance equations become more complex.

Figure 2:
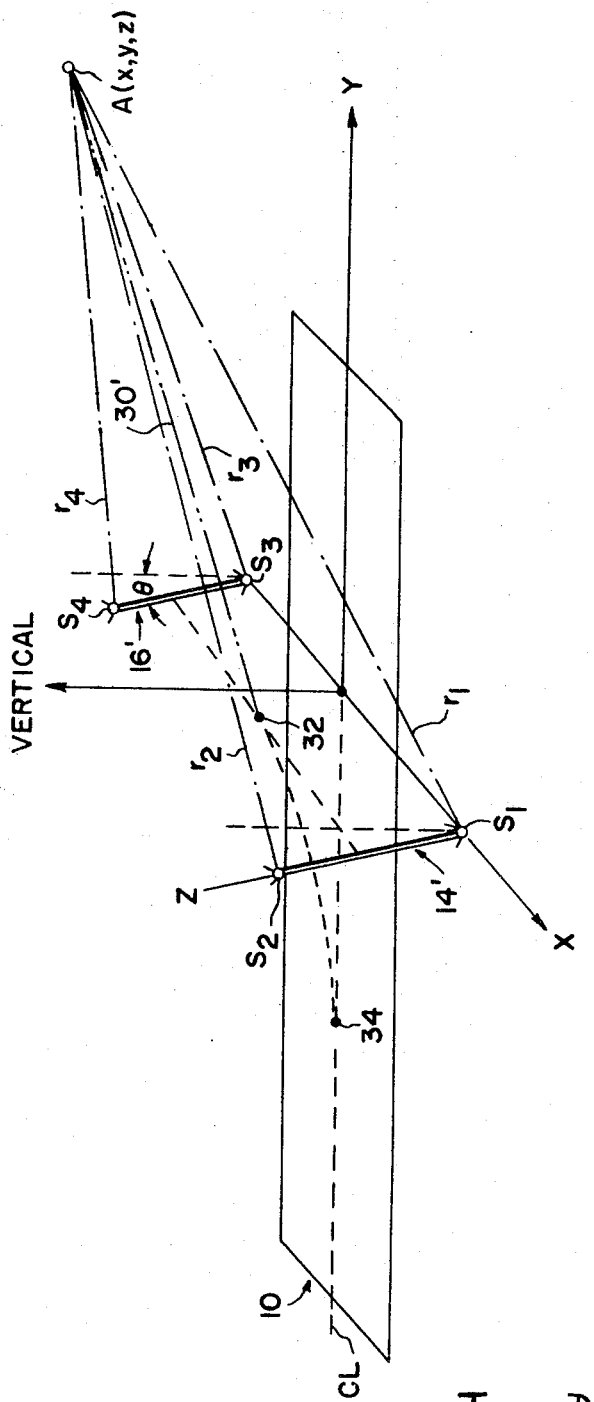
FIG. 2 is a schematic perspective illustration of a modified preferred embodiment of the subject inventive aircraft landing control system such as disclosed in FIG. 1 with the component parts thereof being illustrated in a three-dimensional coordinate system.

An alternative embodiment of the subject inventive system is depicted in FIG. 2. Although this alternative embodiment is substantially the same as that disclosed in FIG. 1, and, of course, utilizes the same "tri-lateration" guidance technique, it is to be noted that the individual antenna units 14' and 16' preferably disposed symmetrically to either side of the center line CL of the runway 10 are not disposed perpendicularly to the surface of the runway as was the case in FIG. 1. Rather, the antenna units 14' and 16' are disposed at an angle $\theta$ to the vertical represented by the $z$ axis of the three-dimensional coordinate system depicted. Such alternative arrangement of the individual antenna units 14' and 16' brings about certain additional advantages in controlling the glide path 30' of an aircraft again initially located at point A.

As discussed with respect to the system of FIG. 1, it was necessary to actually calculate the desired glide path 30 and particularly the slope thereof, such calculations being preferably achieved through computer operation and being based upon various initial measurements of the length of the quantities $r$. On the other hand, the glide path 30' and particularly the slope thereof can be directly determined from the measurements of the distance components $r$ in a system having the geometry of FIG. 2, and an additional computer calculation is thus not required. Of course, eliminating any extra computer operation, in addition to decreasing the complexity of the necessary equipment, would necessarily increase the accuracy and reliability of the system. This is the case with the system of FIG. 2.

The approaching aircraft in the modified system of FIG. 2 is constrained to follow the glide path 30' to its intersection point 32 with the $z$ coordinate system axis in line with and immediately above the center line CL of the runway 10. After the aircraft is brought to point 32, the aircraft would undergo a "flare-out" operation and effect a landing on the runway 10 at point 34, for example. In the system of FIG. 2 the guidance control equation for lateral or $x$ direction displacement is the same as that utilized with respect to the system of FIG. 1, namely:

$$r_2 - r_4 = r_1 - r_3 = 0$$

When this particular relationship between the distance components $r$ is maintained, the aircraft must necessarily have an $x$ component magnitude of 0, that is, follow the center line down to the runway 10. In this respect, the system of FIG. 2 operates the same as the system of FIG. 1 in that a direct measurement of the distance values is sufficient to achieve this desired lateral control.

However, control over the slope of the aircraft landing approach, that is, control over the $z$ and $y$ coordinate component directions is effected by the following guidance control equation: $r_1 - r_2 = r_3 - r_4 = 0$. Thus, the advantage of the system of FIG. 2 is that the condition that the aircraft be on the glide path can be expressed in measured quantities only. Since the calculations required to derive guidance equations are thus reduced, precision control over the approaching aircraft is more facile with the system of FIG. 2 than is the case with the system of FIG. 1.

Further, with the system of FIG. 1, if the glide path were desired to be changed to accommodate the air frame of a particular incoming aircraft, a change in the slope control formula and thus in the computer calculations would be required. In the system of FIG. 2, however, a change in the slope of the glide path can be more effected in a different and sometimes easier manner. For example, the antenna units 14' and 16' could be moved through a different angle to thus automatically change the slope of the glide path 30'. Alternatively, the actual receiving and transmitting antennas on the antenna units 14' and 16' could consist of a plurality of phased arrays to thus shape the beams. In this manner, the effective position of the antenna units 14' and 16', that is the angle $\theta$ that such antenna units make with the vertical, could effectively be changed by merely switching the receiver on to selected elements in the array.

Figure 3:
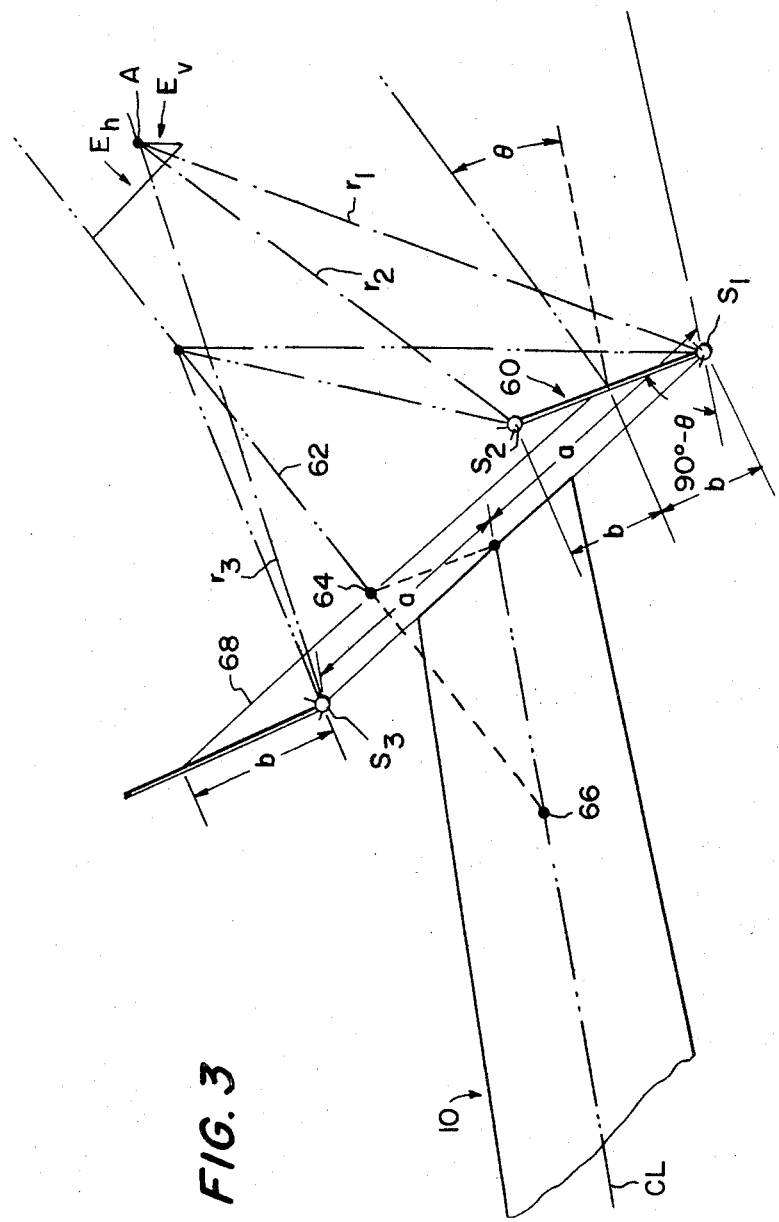
FIG. 3 is a schematic perspective illustration of a general alternative preferred embodiment of the subject inventive aircraft landing control system.

Reference is now made to FIG. 3 wherein a further embodiment of the subject inventive aircraft landing control system is disclosed. The embodiment disclosed in FIG. 3 is patterned after the configuration of the landing system as discussed with respect to FIG. 2 in that the various antenna units are disposed in a plane that is inclined to the vertical by an angle $\theta$. The embodiment of FIG. 3 is a generalized embodiment and discloses the use of but a single antenna unit 60 comprising a station $S_1$ located in the ground plane and a station $S_2$ disposed a distance $2b$ from station $S_1$ on the antenna unit 60. Antenna unit 60 and stations $S_1$ and $S_2$ thereon are disposed at a distance $a$ from a vertical plane through the center line CL of runway 10 to one side thereof. A further station $S_3$ is disposed on the other side of the center line CL of runway 10 a distance $a$ and in the ground plane of the runway 10. In a similar fashion as that discussed with respect to the embodiment of FIG. 2, an approaching aircraft A will be guided along the approach or glide path 62 to point 64 in the plane defined by stations $S_1$, $S_2$, and $S_3$, and located at a distance $b$ from the intersection of the center line of the runway and this plane. After the aircraft passes through this point, it may effect a "flare out" operation to finally touch down at point 66 on the center line CL of runway 10 in a fashion similar to that discussed with respect to the embodiment of FIG. 2.

The three fixed points $S_1$, $S_2$, and $S_3$, the runway and the glide path 62 define a geometric configuration which, although not the most general possible configuration, results in the simplest and possibly the most accurate means for effecting control and guidance of the landing aircraft. The glide path 62 is the locus of all points equidistant from the three fixed points $S_1$, $S_2$, and $S_3$, the three fixed points defining a plane normal to the desired glide path 62. As will be noted, the structural configuration of the embodiment of FIG. 3, is for all practical purposes, identical with that of FIG. 2 with the exception that a fourth station $S_4$ which would normally be disposed above the station $S_3$ of FIG. 3 has been deleted. As will be recalled, only three distances need be measured to effect a position determination and guidance of an approaching aircraft. Thus, the fourth station $S_4$, if provided, would be provided only for purposes of redundancy as discussed above to increase the reliability of the aircraft landing system.

The general configuration or embodiment of FIG. 3 can be employed in any one of several alternative operational modes including, of course, the operational modes discussed with respect to the embodiments of FIG. 1 or 2. For example, it will be recalled that the embodiments of FIGS. 1 and 2 were described as functioning in an operational mode wherein the complex equipment, i.e., the computers and the like, were located on the ground, whereas the approaching aircraft need only carry a simple coherent transponder. Thus, when primary responsibility for controlling the aircraft landing is desired to be placed with ground equipment, the operational modes of FIGS. 1 and 2 can be used as well as some further modifications thereof to be discussed below. On the other hand, the aircraft itself may carry sufficient "on-board" equipment to effect the calculating operations independently of or in lieu of the ground equipment provided. Further, with the configuration of FIG. 3, it is possible that both the aircraft as well as the ground stations can simultaneously serve as the primary mode of control for both single or multiple landings depending upon the ground facilities provided and/or the "on-board" capabilities of the approaching aircraft. Of course, all of the various configurations and operational modes of the novel aircraft landing control system employ the described "trilateration" technique to locate the aircraft in a precise pattern with respect to any desired spatial reference. Thus, regardless of the particular operational mode utilized, control of the aircraft's position is derived by relating each of three distances between the aircraft located at point A and each of the three fixed points $S_1$, $S_2$, and $S_3$ located on the ground.

Referring again specifically to the structural configuration of FIG. 3, the approaching aircraft A is depicted as being displaced from the desired approach or glide path 62 by an amount $E_v$ in the vertical direction and by an amount $E_h$ in the hoirzontal direction. As will be apparent, with the aircraft A in any position relative to the fixed coordinates of FIG. 3, the following equations hold:

(13e) $$E_v = \frac{1}{4b}(r_1 - r^2)(r_1 + r_2)$$

(13f) $$E_h = \frac{1}{4a}(r_1 - r_3)(r_1 + r_3)$$

where $E_h$ and $E_v$ are the respective horizontal and vertical deviations from the glide path 62 with reference to the glide plane defined by line 68 and the glide path 62. The respective distances between the points $S_1$, $S_2$, $S_3$, and the approaching aircraft A are denoted as lines $r_1$, $r_2$, and $r_3$, as was similarly the case with the embodiment of FIGS. 1 and 2. If the approaching aircraft A is on course, that is, on the glide path 62, then, due to the chosen geometry of the inventive configuration, the three distance ranges $r_1$, $r_2$ and $r_3$ will each equal the other and, accordingly, the error $E_h$ and $E_v$ will both equal zero.

From the above error Equations 13e and 13f, it is clear that if the difference terms $(r_1 - r_2)$ and $(r_1 - r_3)$ are made as close to zero as possible, the approaching aircraft A will be on the desired path. Furthermore, if the value of these difference terms can be obtained, then it is no longer necessary to determine the actual values of $r_1$, $r_2$, and $r_3$ in order to determine whether or not the aircraft is on course. However, if the aircraft is not on course $(r_1 + r_2)$ and $(r_1 + r_3)$ must be known to determine precisely what corrective action must be taken. For example, Equation 13b shows that the magnitude of the correction needed has a scale factor $$(r_1+r_3)/4a$$

However, this sum does not enter directly into the precise on-course conditions. Thus, if the distances $r_1$, $r_2$, and $r_3$ differ from their actual or true values by the same amount, precise measurement of the actual distances is not required. Additionally, with the structural configuration of FIG. 3 as stated above, landing control over the approaching aircraft A can be exercized either on the aircraft itself or on the ground if knowledge of the difference terms $(r_1-r_2)$ and $(r_1-r_3)$ exists. As will be recalled, this capability of exercising landing control either from the ground or on board the aircraft itself, or simultaneously, did not exist with respect to the operation discussed with the embodiments of FIGS. 1 and 2 which, for purposes of description, have been constrained to be operative only in the mode wherein the ground controls the guidance of the approaching aircraft.

Generally speaking, each of the advantages and operational features described with respect to the systems of FIGS. 1 and 2 also are present with the generalized system of FIG. 3. Thus, multiple landings can be sequentially or simultaneously effected and control over landings at adjacent runways as well as the depicted runway is also possible. Further, for fixed values of $|r_1-r_2|$ and $[r_1-r_3]$ different from zero, the error magnitudes $E_v$ and $E_h$, in all cases of the generalized system, tend to become smaller as the aircraft A approaches the edge of runway 10.

As stated above, the generalized configuration of FIG. 3 can operate in a multiplicity of modes all utilizing the "tri-lateration" technique depending upon the complexity of the ground facilities and/or the complexity of the aircraft "on-board" facilities and capabilities desired. Thus, the remainder of this discussion with respect to FIG. 3 will briefly set forth many, although not all, of the possible operational modes and techniques.

System I.—"Signal in Space Operation"

The System I or "signal in space" operational mode can itself be provided with different configuration possibilities, each configuration having in common the fact that the various ground stations $S_1$, $S_2$, and $S_3$ all continuously radiate or transmit a signal in the direction of the approaching aircraft A.

Configuration Ia—"Aircraft Control Only"

When it is desired to have only the aircraft itself effect the calculations necessary to produce proper guidance commands, then the following physical components are contemplated to be utilized within the system. Ground station $S_1$ would comprise two transmitters, $T_1$ and $T_4$. Ground station $S_3$ would comprise one transmitter and one receiver, $T_3$ and $R_0$ respectively. Ground station $S_2$ would comprise a single transmitter $T_2$. The aircraft itself would carry four receivers, $R_1$, $R_2$, $R_3$ and $R_4$ respectively as well as one transmitter $T_0$.

As stated above, transmitters $T_1$, $T_2$ and $T_3$ located respectively at ground stations $S_1$, $S_2$ and $S_3$ continuously transmit a signal towards the approaching aircraft A, these signals being received via the respective receivers $R_1$, $R_2$, and $R_3$ on board the aircraft. Phase comparison between signals received via receivers $R_1$ and $R_2$, would directly provide the quantity $(r_1-r_2)$ whereas phase comparison btween the signals received by receivers $R_1$ and $R_3$ on board the aircraft would directly provide the quantity $(r_1-r_3)$. Such phase comparison could, of course, be the same type of phase comparison described with respect to the initially discussed inventive embodiment of FIG. 1. Thus, the "difference" quantities of Equations 13e and 13f can be directly determined.

The transmitter $T_0$ carried on board the aircraft in this embodiment would transmit a signal to receiver $R_0$ located at $S_3$. Receiver $R_0$ at station $S_3$ would then pass this signal to station $S_1$ i.e., a distance equal to $2a$ whereat station $S_1$ via transmitter $T_4$ would retransmit the signal back to the aircraft to be received by receiver $R_4$ carried thereon.

Accordingly, this procedure would directly yield the quantity $(r_1+r_2+2a)$ through simple phase comparison techniques. At this point, the directly obtained quantities are rewritten below for clarity:

(14) $R(1,2)=(r_1-r_2)$
(15) $R(1,3)=(r_1-r_3)$
(16) $S(1,3)=(r_1+r_3+2a)$

Once the quantities identified by Equations 14, 15 and 16 have been directly obtained, the following quantities can easily be calculated by a computer technique carried out on board the approaching aircraft:

(17) $$R(3,2)=(r_3-r_2)$$
$$S(1,2)=(r_1+r_2+2b)$$
$$K_h=\frac{S(1,3)}{4a}$$
$$K_v=\frac{S(1,2)}{4b}$$

wherein $K_h$ and $K_v$ are multiplication factors to be used below.

Close approximations to the actual horizontal and vertical error or glide path deviation equations are as follows:

(21) $\quad E_h \approx K_h \cdot R(1,3)$
(22) $\quad E_v \approx K_v \cdot R(1,2)$ However, if $E_h$ and $E_v$ must be known exactly, then the following formulations hold:

(23) $$E_h=\left(K_h-\frac{1}{2}\right) \cdot R(1,3)$$

(24) $$E_v=\left(K_v-\frac{a}{2b}\right) \cdot R(1,2)$$

As should be apparent, with the configuration Ia of the "signal in space" modification, multiple landings as well as single landings could also be handled if each of the approaching aircraft are constrained to utilize the same glide slope.

Also as should be apparent, however, thet configuration IA modification as so far described, makes no provisions for the redundant operation necessary to achieve high reliability. In this regard, if such redundant operation were desired, the subject invention contemplates the additional provision of a receiver at each of the ground stations $S_1$, $S_2$ and $S_3$, and a transponder on board the approaching aircraft, whereby, as should be apparent, this configuration would then have the same capabilities of effecting actual ground control over the landing as was discussed with respect to the system of FIG. 2. Thus, the capability of the landing system, in this instance, would be augmented such that the ground as well as the aircraft is given sufficient information to control a landing. This capability, of course, can be used as a back-up to the actual aircraft control of the landings, or for controlling incoming aircraft that are not themselves equipped with the sophisticated on-board calculating equipment and are, instead, only equipped with a simple transponder.

Configuration Ib.—"No Transmitter Above Ground"

A further modification is possible on the "signal in space" concept discussed above wherein the ground equipment provided is such that no transmitter is located above the actual ground plane. It, of course, may be desirable to avoid placing a transmitter above the ground plane since such would reduce the possible problems occurring from ground reflections. In this modification, the aircraft also would carry sufficient sophisticated on-board equipment to control its own landing and, although the inventive configuration would still be that generally depicted in FIG. 3, the various ground stations and the approaching aircraft would include the following equipment.

Ground station $S_1$ would comprise transmitters $T_1$, $T_2$ and $T_4$ and a receiver $R_0$ operatively connected so as to actuate transmitter $T_4$ when a signal is received, $R_0$ and $T_4$ acting as a transponder.

Ground station $S_3$, on the other hand, would comprise but a single transmitter $T_3$. Further, ground station $S_2$ would comprise but a single receiver $R_0$. The approaching aircraft A would carry four receivers, $R_1$, $R_2$, $R_3$ and $R_4$, and a single transmitter $T_0$.

Now, a ranging signal emanating from transmitter $T_0$ on board the aircraft is received by receivers $R_0$ located at both ground stations $S_1$ and $S_2$. The signal received at ground station $S_2$ would be conducted to ground station $S_1$ along a distance $2b$ and be retransmitted by transmitter $T_2$ thereat, whereby receiver $R_2$ on board the aircraft picks up the signal. The signal from transmitter $T_0$ on board the aircraft which is received at ground station $S_1$ by receiver $R_0$ is then delayed by an amount of time corresponding to the distance $2b$ and then is also retransmitted by transmitter $T_4$ at ground station $S_1$ whereby receiver $R_4$ on the aircraft picks up this retransmitted signal. Transmitter $T_1$ at station $S_1$ would continuously transmit and such transmission would be received by receiver $R_1$ on board the aircraft. Through various phase comparison techniques utilizing equipment similar to that discussed with the system of FIG. 1, the following quantities can be obtained directly:

(25) $\quad R(1,3)=r_1-r_3$
(26) $\quad S(1,2)=r_1+r_2+2b$
(27) $\quad S(1,1)=2r_1+2b$
(28) $\quad R(1,2)=r_1-r_2$ and the following quantities can be calculated:

(29) $\quad S(1,3)=S(1,1)-R(1,3=r_1+r_3+2b)$

(30) $\quad K_h=\dfrac{S(1,3)}{4a}$

(31) $\quad K_v=\dfrac{S(1,2)}{2b}$

(32) $\quad E_h \approx R(1,3) \cdot K_h$

(33) $\quad E_v \approx R(1,2) \cdot K_v$

If exact values of $E_h$ and $E_v$ are desired, then the following equations hold:

(34) $\quad K_h'=\left(K_h-\dfrac{b}{2a}\right)$

(35) $\quad K_v'=\left(K_v-\dfrac{1}{2}\right)$

(36) $\quad E_h=R(1,3) \cdot K_h'$

(37) $\quad E_v=R(1,2) \cdot K_v'$

In a similar fashion as that discussed in configuration Ia above, this configuration can itself be augmented by providing an additional three receivers on the ground and a transponder on board the aircraft whereby the ground also can provide complete landing control and guidance of the approaching aircratf as a "back-up" if desired, in addition to or in lieu of the control exhibited by the aircraft itself.

System II.—"Interrogation by Aircraft"

A further approach to the general system configuration of FIG. 3 is that headed above as "interrogation by aircraft" wherein the capability of deriving position data in the air can be accomplished by locating the source of the local reference for ranging on the aircraft itself instead of on the ground as was done in the System I modification.

Configuration IIa.—"Aircraft Control Only"

Again, using the general configuration of FIG. 3, if it is desired that the aircraft itself control its landing approach, then the following equipment would be provided at the various ground stations and on board the approaching aircraft. A transponder comprising a receiver $R_0$ and a transmitter $T_1$ actuated thereby would be provided at ground station $S_1$. A single transponder comprising a receiver $R_0$ and a transmitter $T_2$ actuated thereby would be provided at ground station $S_2$. Likewise, a single transponder comprising a receiver $R_0$ and a transmitter $T_3$ actuated thereby would be provided at ground station $S_3$. The aircraft, in this modification, would carry on board three receivers $R_1$, $R_2$ and $R_3$, as well as a transmitter $T_0$ in addition to the necessary "on board" computing or calculating equipment.

In this configuration, the transmitter $T_0$ on board the aircraft would transmit a ranging signal which would be received by the receivers $R_0$ at each of the three ground stations $S_1$, $S_2$ and $S_3$. Upon receipt of the signals at these ground stations, the respective transmitters $T_1$, $T_2$ and $T_3$ would be actuated and retransmit the signal to be received on board the aircraft at receivers $R_1$, $R_2$ and $R_3$ carried thereon. In this manner, the lengths of each of the distance paths $r_1$, $r_2$ and $r_3$ can be directly measured through the phase comparison techniques discussed above. On the other hand, the following quantities can easily be calculated:

(38) $\quad R(1,2)=r_1-r_2$
(39) $\quad R(1,3)=r_1-r_3$
(40) $\quad S(1,2)=r_1+r_2$
(41) $\quad S(1,3)=r_1+r_3$ $$K_h=\dfrac{S(1,3)}{4a}$$

$$K_v=\dfrac{S(1,2)}{4b}$$

leading to the error or deviation equations below:

$$E_h=K_h \cdot R(1,3)$$
$$E_v=K_v \cdot R(1,2)$$

With the equipment utilized in configuration IIa, the ground has sufficient information for qualitative control of the landing: i.e., "on course," "off-course," and "sense" of the required correction. By adding a transmitter $T_x$ at ground station $S_1$, and a transponder comprising a receiver $R_x$ and associated transmitter $T_4$ on board the aircraft and an additional receiver $R_4$ at ground station $S_1$, then the ground itself can actualy provide the guidance for landing the approaching aircraft. Of course, this capability is a "back-up" capability to be used simultaneously with or in lieu of the aircraft control over its own landing and, as should be apparent, the method of landing control to be used by the ground in this instance is the same as that described with respect to system modification Ia with the roles of the aircraft and ground in this regard reversed.

Configuration IIb.—"No Transmitters Above Ground"

A slight modification of configuration IIa discussed above can be made to avoid the placement of any transmitters at the ground above the ground plane. As will be recalled, the placement of a transmitter above the ground plane might increase the possibility of difficulties with respect to ground reflections. In this further modified embodiment, the transmitter $T_2$ previously located at ground station $S_2$ in configuration IIa is removed and is placed instead at the ground station $S_1$. By such removal, a delay corresponding to the distance $2b$ is introduced in the signal path from the aircraft to ground station $S_2$ to ground station $S_3$ back to the aircraft. To balance this extra delay term from the other paths, an equal delay is introduced in the other two transponders located at stations $S_1$ and $S_3$. In other words, upon receipt of a signal at the receivers $R_0$ located at both stations $S_1$ and $S_3$, a delay corresponding to the distance $2b$ ensues before the respective transmitters $T_1$ and $T_3$ on the ground retransmit the signal to the aircraft. In every other respect, the system of configuration IIb is the same as that discussed with respect to system IIa and the method for control and guidance is likewise identical.

As should now be apparent, the number and variety of possible modifications to the basic inventive system depicted in FIG. 3 are virtually limitless and, accordingly, the subject inventive system, utilizing the "tri-lateration" technique discussed above, can be modified to suit the particular requirements of any given airport and can be made compatible with virtually all varieties and complexities of "on-board" equipment carried by approaching aircraft. To summarize, then, the subject inventive landing control system can thus provide ground control over the approaching aircraft, "on-board" aircraft control over its own landing approach, or both, when and if desired.

Figure 4:
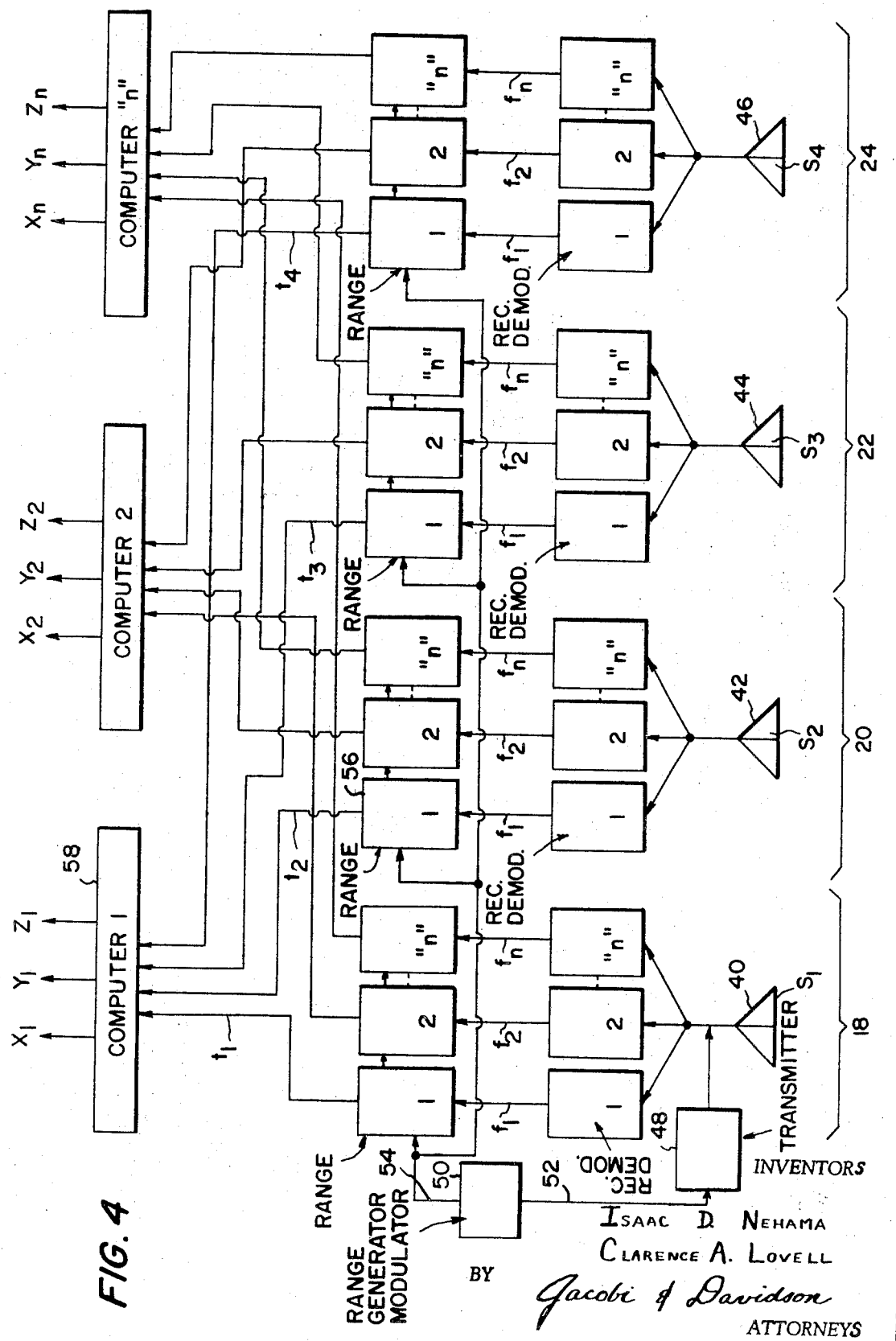
FIG. 4 is a schematic block diagram of the physical components contemplated for use with the embodiments of the invention depicted in FIGS. 1 and 2, for example, such physical components effecting the actual aircraft landing guidance information.

Having now had an opportunity to consider the basic techniques and the basic structural configuration of the subject novel inventive aircraft landing control system, the remainder of this discussion will be directed towards a disclosure of suitable electrical and electronic components contemplated for actual use within a landing control system of the general type disclosed. Reference is now made to FIG. 4 of the appended drawings wherein a schematic block diagram of the actual electrical and electronic components utilized in the inventive embodiment of FIG. 1, for example, is depicted.

Four receiving and/or transmitting ground stations 18, 20, 22 and 24 are illustrated. Each of the receiving and/or transmitting ground stations comprise antennas 40, 42, 44 and 46, respectively. These antennas are located at points $S_1$, $S_2$, $S_3$ and $S_4$ in the three-dimensional coordinate system of FIG. 1 or 2. For purposes of description, antenna 40 has been depicted as connected to a transmitter 48, the carrier wave of which is modulated by a modulator 50. Thus, location $S_1$ is, for exemplary purposes, depicted as the transmitting station of the system. The remaining stations, $S_2$, $S_3$, and $S_4$ as well as $S_1$ are receiving stations. The actual physical construction of the various antennas 40 through 46 utilized in the system is not critical. Such antennas should not be highly directive, however, and likewise such antennas should not be omnidirectional either. In practice, it has been found that either small parabolic reflectors or simple dipole arrays produce the most suitable antenna beam characteristics both for transmitting and receiving signals in the direction of the approaching aircraft.

Figure 5:
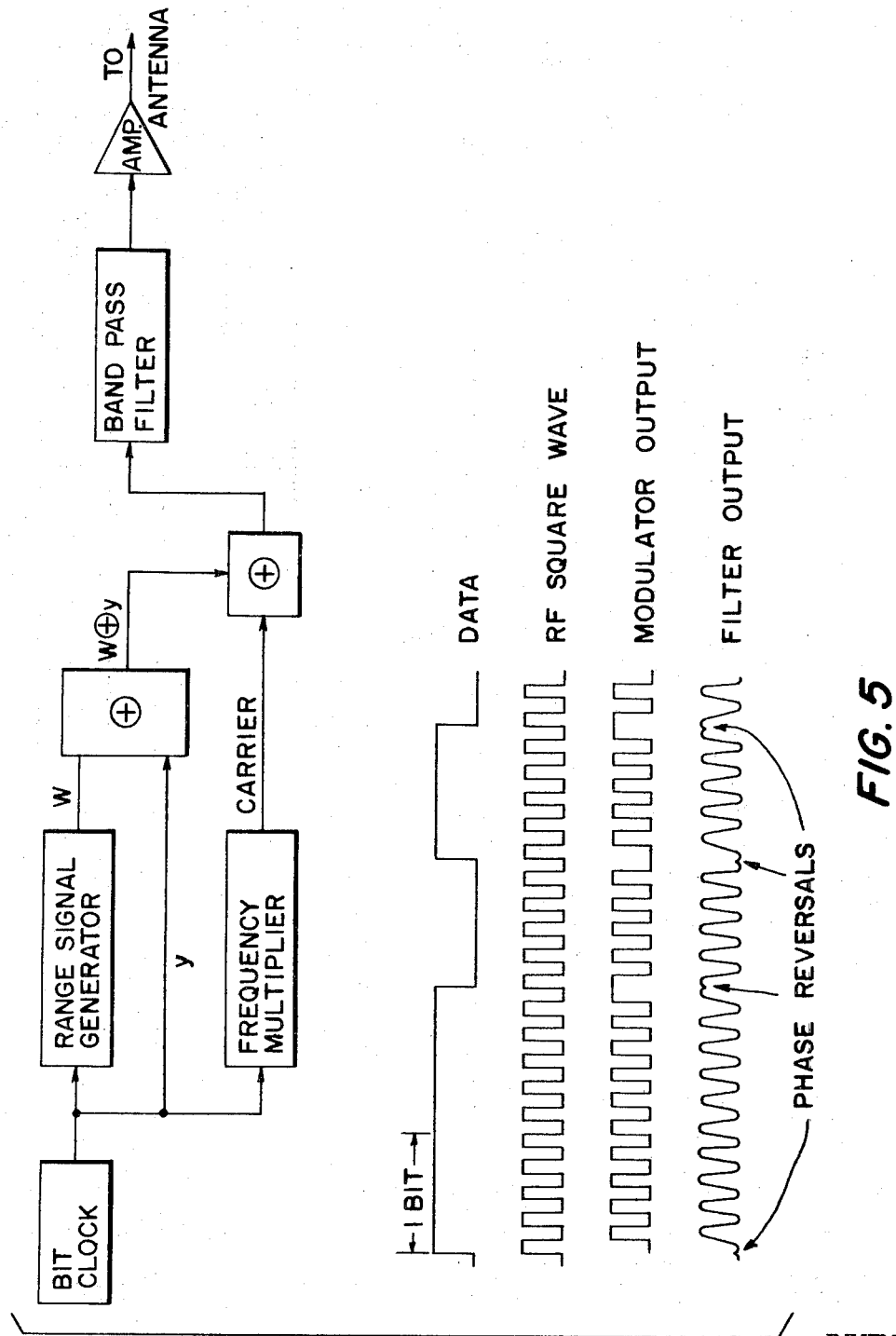
FIG. 5 depicts certain details of the block diagram of FIG. 4.

As mentioned above, transmitting antenna 40 disposed at point $S_1$ or location 18 in the system of FIG. 1, is coupled to a transmitter means 48 which continuously generates a radio frequency carrier. The range signal preferably generated by range generator-modulator 50 consists of a carrier having a square wave form and a modulating signal also having a square wave form. The modulator, in a preferred embodiment thereof, comprises a logic circuit variously known as a half-adder, an exclusive "OR" circuit, or a MOD-2 sum circuit. FIG. 5 depicts a block diagram of this preferred circuit in more detail for illustrative purposes and shows the input carrier and modulating wave forms, the output wave form from the modulator, and the same output wave after being passed through a band pass filter which is amplified and applied to the transmitting antenna. As is apparent from the wave forms of FIG. 5, changes of the modulating data from a "one" to a "zero" or vice versa produces a 180° shift in the phase of the transmitted carrier.

This modulated or coded carrier signal is transmitted by antenna 40 toward the approaching aircraft 26 and such coded signal serves to interrogate transponder 28 carried on board the aircraft 26 as has been discussed above. The physical configuration of the transponder is also not necessary for an understanding of the subject invention, as the only requirement for the transponder is that it will be actuated by the coded signal transmitted by antenna 40 and serve to retransmit the coded portion thereof with the same phase but on a different carrier frequency specified over a command data link. The retransmitted signal from transponder 28 is received by the receiving antennas 40, 42, 44 and 46 disposed at stations 18, 20, 22 and 24 of the system. The received signal from each of the receiving antennas 40, 42, 44 and 46 are sent to a plurality of demodulator units 1, 2, . . . "n" associated with each antenna. As previously explained, each incoming aircraft, when such aircraft are in close spacing with respect to one another, are assigned different frequencies for retransmission of the coded signal. Any number of different frequencies can be assigned to each aircraft and, for this reason, a plurality of demodulator units 1 through "n" are associated with each receiving antenna. Demodulator units 1, 2, . . . "n" are frequency selective and each will pass only one modulated carrier, i.e., that from a specific aircraft.

Since each receiving unit is preferably identical in construction, the actual operation of receiving unit 20 or that unit located at point $S_2$ of the three-dimensional coordinate system in FIG. 1 or 2, will be described in more detail.

Assuming now that a single aircraft is approaching the airport runway 10 for landing purposes, the retransmitted signal from transponder 28 thereon will be received by receiving antenna 42 and, if this signal is a modulated carrier of frequency $f_1$, for example, receiver demodulator unit 1 will be the only receiver demodulator unit to pass the signal. The other receiver demodulator units of station 20 serve to pass various other modulated carrier frequencies from the transponders 28 of different aircraft. Coded signal $f_1$ is thus passed through receiver demodulator unit 1 and the range information recovered. As explained above, the coded signal $f_1$ from the transponder 28 of aircraft 26 will be the same coded signal generated by modulator means 50 and serving to modulate transmitter 48. The phase, however, of the coded signal $f_1$ received by the receiver antenna 42 will be shifted with respect to the modulating or coded signal that modulator means 50 would presently be generating. The received signal $f_1$ in this instance, would be utilized to obtain information concerning the length of paths $r_1+r_2$ since the original signal is transmitted from station 18 of FIG. 1, along path $r_1$ to the transponder 28 located at point A, retransmitted from transponder 28 along path $r_2$ to the receiver station 20 located at point $S_2$. The coded signal $f_1$ is then passed into a ranging unit 56 wherein the phase of the coded signal $f_1$ relative to the phase of the presently generated modulating or coded signal on line 54 from modulator means 50 is compared. The phase difference or shift between the signal on line 54 and the coded signal $f_1$ represents, as described above, the time taken for the transmitted signal to traverse the path $r_1+r_2$.

A further signal $t_2$ is produced by the phase comparison between signal $f_1$ received by the receiving antenna 42 and the continuously generated modulating signal on line 54. Signal $t_2$ is representative of the value illustrated in Equation 3 above, and this signal is sent to a digital computer unit 58 for further use.

In a similar manner as that described above, each of the other receiving antennas 44, 46 and, in the preferred embodiment, combined receiving and transmitting antenna 40, select out coded signals from the transponder of the aircraft which are modulated on a carrier of specified frequency. Each of the receiving stations, through use of their respective demodulator means and range units, produce further time signals $t_1$, $t_3$, and $t_4$ corresponding to Equations 4, 3, and 1 above. Signals $t_1$, $t_2$, $t_3$, and $t_4$ derived from one incoming aircraft retransmitting on a specified frequency, are all fed into the computer means 58 otherwise designated computer 1, whereby the various equations given above may be solved to produce an output $x_1$, $y_1$, and $z_1$ indicative of the actual position of the incoming aircraft 26. From this point, a further nonillustrated computer unit could be utilized to generate the actual guidance and control data discussed above. Alternatively, computer 58 could itself be programmed to directly produce the desired command and guidance information.

As additional planes approach the airport runway 10 for a landing, each subsequent plane would be assigned a different retransmission frequency $f_1$ for its transponder unit 28. In the same fashion as described above, the particular retransmitted carrier frequency upon which the modulating signal is impressed generated by the modulator means 50, is demodulated after receipt at the various receiving antennas through other ones of the demodulator units associated therewith, and the demodulated signals are sent through the respective ranging units to various ones of the computers, such as computer 2, ... through computer "n," whereby guidance and control information for each plane is simultaneously resolved.

As should now be apparent, the objects initially set forth at the outset of the specification have been successfully achieved. Accordingly,

What is claimed is:

1. A control system for landing aircraft on a runway, said control system comprising:

at least three spaced-apart antenna means disposed with respect to the ground in a predetermined triangular geometric relationship;

at least one antenna means disposed on the aircraft;

radio communication equipment means for each of said ground antenna means and for said antenna means on the aircraft to provide radio links therebetween, said ground antenna means continuously transmitting ranging signals to said aircraft antenna means; and, means associated with said radio communication equipment means and carried on board the aircraft for deriving the linear distances between the aircraft and each of said triangularly spaced-apart ground antenna means and for developing an output therefrom representative of the three-dimensional spatial position of the aircraft with respect to said ground antenna means; and, means for electrically comparing the position of the aircraft as determined by said derived linear distances with a desired position defined by a predetermined glide path.

2. A control system as defined in claim 1, wherein said predetermined geometric relationship of said ground antenna means is such that said ground antenna means are disposed in a single plane canted at an angle with respect to the vertical corresponding to the slope angle of the glide path of the aircraft to be landed.

3. A control system as defined in claim 2, wherein said predetermined geometric relationship of said ground antenna means is such that at least one of said ground antenna means is disposed in a different horizontal plane than the remainder of said ground antenna means.

4. A control system as defined in claim 3, wherein at least one of said ground antenna means is disposed above the ground, said remainder of said ground antenna means being disposed on the ground, and wherein only said remainder of said ground antenna means transmits ranging signals to said aircraft antenna means, whereby ground reflections are reduced.

5. A control system as defined in claim 3, further including a second means associated with said radio communication equipment means and disposed on the ground for independently deriving the linear distances between at least three of said ground antenna means and said aircraft antenna means and for developing an independent output representative of the three-dimensional spatial position of the aircraft to be landed from said derived distances, whereby both the aircraft and the ground can control the landing of the aircraft.

6. A control system for landing aircraft on a runway, said control system comprising:

at least three spaced-apart antenna means disposed with respect to the ground in a predetermined triangular geometric relationship;

at least one antenna means disposed on the aircraft;

radio communication equipment means for each of said ground antenna means and for said antenna means on the aircraft to provide radio links therebetween, said aircraft antenna means transmitting an interrogation signal to each of said ground antenna means, said ground antenna means responding by transmitting ranging signals to said aircraft antenna means; and means associated with said radio communication equipment means carried on board the aircraft for electrically determining the spatial position variance of the aircraft to be landed from the locus of points equidistant from each of said ground antenna means, said locus defining a linear glide path, whereby the aircraft controls its own landing.

7. A control system as defined in claim 6, wherein said predetermined geometric relationship of said ground antenna means is such that each said ground antenna means is disposed in a single plane canted at an angle with respect to the vertical corresponding to the slope angle of the glide path of the aircraft to be landed.

8. A control system as defined in claim 7, wherein said predetermined geometric relationship of said ground antenna means is further such that at least one of said ground antenna means is disposed in a different horizontal plane than the remainder of said ground antenna means.

9. A control system as defined in claim 8, wherein at least one of said ground antenna means is disposed above the ground and wherein said remainder of said ground antenna means is disposed on the ground, only said remainder of said ground antenna means transmitting ranging signals to said aircraft antenna means whereby ground reflection is reduced.

10. A control system as defined in claim 8, further including an additional means associated with said radio communication equipment means located on the ground for independently deriving the linear distances between at least three of said ground antenna means and said aircraft antenna means and for independently developing an output representative of the three-dimensional spatial position of the aircraft to be landed from said derived distances, whereby both the ground and the aircraft can control the aircraft landing.

11. A method for landing aircraft on a runway by utilizing signals transmitted between ground station means and aircraft means, said method comprising the steps of:

transmitting electrical signals between at least three triangularly spaced locations fixed with respect to the runway, and said aircraft means;

electrically deriving from the signals which travel between said aircraft means and said three triangularly spaced locations, the linear distances between said aircraft means and each of said three triangularly spaced locations, whereby the three-dimensional spatial position of said aircraft with respect to the ground station means is determined;

electrically comparing the position of said aircraft determined by said derived linear distances with a desired position defined by a predetermined glide path; and correcting the position of said aircraft so as to correspond with said predetermined glide path, whereby the aircraft is landed on the runway.

12. The method of claim 11, wherein said predetermined glide path comprises the locus of points equidistant from said three triangularly spaced locations.

13. A control system for landing aircraft on a runway, said control system comprising:

at least three spaced-apart antenna means disposed with respect to the ground in a predetermined triangular geometric relationship;

at least one antenna means disposed on the aircraft;

radio communication equipment means for each of said ground antenna means and for said antenna means on the aircraft so as to provide radio links therebetween;

means associated with said radio communication equipment means for electrically deriving the linear distances between the aircraft and each of said three triangularly spaced-apart ground antenna means and for developing an output representative of the three-dimensional spatial position of the aircraft with respect to said ground antenna means; and, means for electrically comparing the position of the aircraft as determined by said derived linear distances with a desired position defined by a predetermined glide path.

14. A control system as defined in claim 13, wherein at least one of said ground antenna means is disposed in a different, higher horizontal plane than the remainder of said ground antenna means.

15. A control system as defined in claim 14, further including a fourth spaced-apart ground antenna means, and wherein said means associated with said radio communication equipment means develops an output representative of the three-dimensional spatial position of the aircraft by electrically deriving the linear distances between the aircraft and any three of said ground antenna means, whereby said control system is capable of total redundant operation.

16. A control system as defined in claim 14, wherein said radio communication equipment means includes only radio receiver means for said one of said ground antenna means disposed in said different, higher horizontal plane than the remainder of said ground antenna means, such that no transmitters are provided above ground.

17. A control system for landing aircraft on a runway, said control system comprising:

at least three spaced-apart antenna means disposed with respect to the ground in a predetermined triangular geometric relationship to either side of the runway such that each said antenna means is disposed in a single plane canted at an angle with respect to the vertical corresponding to the slope angle of the glide path of the aircraft to be landed;

at least one antenna means disposed on the aircraft;

radio communication equipment means for each of said ground antenna means and for said antenna means on the aircraft so as to provide radio links therebetween;

means associated with said radio communication equipment means for electrically determining the spatial position variance of the aircraft to be landed from the locus of points equidistant from each of said ground antenna means, said locus defining a linear glide path; and a fourth-spaced antenna means disposed in said single plane such that each of said spaced-apart ground antenna means defines a corner of a rectangular geometric figure, said means associated with said radio communication equipment means determining said spatial position variance from the locus of points equidistant from any three of said four ground antenna means, whereby said control system is capable of total redundant operation.

18. A control system for landing aircraft on a runway, said control system comprising:

at least three spaced-apart antenna means disposed with respect to the ground in a predetermined triangular geometric relationship to either side of the runway such that each said antenna means is disposed in a single plane canted at an angle with respect to the vertical corresponding to the slope angle of the glide path of the aircraft to be landed;

at least one antenna means disposed on the aircraft;

radio communication equipment means for each of said ground antenna means and for said antenna means on the aircraft so as to provide radio links therebetween;

means associated with said ratio communication equipment means for electrically determining the spatial position variance of the aircraft to be landed from the locus of points equidistant from each of said ground antenna means, said locus defining a linear glide path; and, said aircraft antenna means transmitting an interrogation signal to each of said ground antenna means, said ground antenna means responding by transmitting ranging signals to said aircraft antenna means.

19. A control system for landing aircraft on a runway, said control system comprising:

at least three spaced-apart antenna means disposed with respect to the ground in a predetermined triangular geometric relationship to either side of the runway such that each said antenna means is disposed in a single plane canted at an angle with respect to the vertical corresponding to the slope angle of the glide path of the aircraft to be landed;

at least one antenna means disposed on the aircraft;

radio communication equipment means for each of said ground antenna means and for said antenna means on the aircraft so as to provide radio links therebetween;

means associated with said radio communication equipment means for electrically determining the spatial position variance of the aircraft to be landed from the locus of points equidistant from each of said ground antenna means, said locus defining a linear glide path;

two of said ground antenna means disposed in said single plane being substantially closer to the ground than the remainder of said ground antenna means, said radio communication equipment means comprising only receiver means for said remainder of said ground antenna means, such that no transmitters are provided above ground.

References Cited

UNITED STATES PATENTS

| | | | |
|---|---|---|---|
| 2,611,124 | 9/1952 | Hart | 343—112X |
| 2,821,704 | 1/1958 | O'Day | 343—15 |
| 2,748,385 | 5/1956 | Rust et al. | 343—108 |
| 3,064,929 | 11/1962 | Gard | 343—108 |
| 3,082,419 | 3/1963 | Crossland | 343—108 |
| 3,101,471 | 8/1963 | Stavis | 343—108(R) |
| 3,164,827 | 1/1965 | Preikschat | 343—108X |
| 3,181,153 | 4/1965 | Cella | 343—108(R) |
| 3,204,237 | 8/1965 | Overcash | 343—108(R) |

RODNEY D. BENNETT, Primary Examiner

T. H. TUBBESING, Assistant Examiner

U.S. Cl. X.R.

343—15, 108

UNITED STATES PATENT OFFICE
CERTIFICATE OF CORRECTION

Patent No. 3,564,543　　　　　　　　　　Dated February 16, 1971

Inventor(s) I. D. Nehama et al

It is certified that error appears in the above-identified patent and that said Letters Patent are hereby corrected as shown below:

1) Column 9, formula (13a), the left-hand portion thereof should read:
$$x = \frac{r_3^2 - r_1^2}{4a}$$

2) Column 12, formula (13e), the portion reading: $(r_1-r^2)$ should read $(r_1-r_2)$ 3) Column 14, line 6, the formula should read: $(r_1 + r_3 + 2a)$ 4) Column 14, the three formulas following below formula (17) should respectively be numbered (18), (19) and (20).

5) Column 14, line 45; "thet" should read --that--

6) Column 15, formula (29) should read:
$$S(1,3) = S(1,1) - R(1,3) = r_1 + r_3 + 2b$$

7) Column 16, the four formulas following below formula (41) should respectively be numbered (42), (43), (44) and (45).

Signed and sealed this 15th day of February 1972.

(SEAL)
Attest:

EDWARD M. FLETCHER, JR.　　　　　　ROBERT GOTTSCHALK
Attesting Officer　　　　　　　　　　Commissioner of Patents